(12) United States Patent
Alston (10) Patent No.: US 7,694,047 B1
(45) Date of Patent: Apr. 6, 2010

(54) METHOD AND SYSTEM FOR SHARING INPUT/OUTPUT DEVICES

(75) Inventor: Jerald K. Alston, Coto de Caza, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 165 days.

(21) Appl. No.: 11/355,622

(22) Filed: Feb. 16, 2006

Related U.S. Application Data (60) Provisional application No. 60/653,737, filed on Feb. 17, 2005.

(51) Int. Cl.
*G06F 13/38* (2006.01)
(52) U.S. Cl. .......................................... 710/62; 710/38
(58) Field of Classification Search .................... 710/62
See application file for complete search history.

(56) References Cited

U.S. PATENT DOCUMENTS

2003/0225724 A1* 12/2003 Weber ........................... 707/1

2004/0268015 A1* 12/2004 Pettey et al. ................. 710/313
2005/0086549 A1* 4/2005 Solomon et al. ............ 713/320

OTHER PUBLICATIONS

Tanenbaum, Andrew S. "Structured Computer Organization", 1984, Prentice-Hall, 2nd Edition, p. 11.*

* cited by examiner

*Primary Examiner*—Henry W. H. Tsai
*Assistant Examiner*—John B Roche
(74) *Attorney, Agent, or Firm*—Klein, O'Neill & Singh, LLP (57) ABSTRACT

A PCI-Express module that is coupled to plural host systems and to at least an input/output (I/O) device is provided. The PCI-Express module includes an upstream port module and a downstream port module that use a mapping table to facilitate the plural host systems sharing the I/O device by modifying a transaction layer packet (TLP) field. For upstream ID based traffic, a source identifier is replaced based on the mapping table and a destination identifier is replaced with a value that is captured during upstream port module initialization. For upstream address based traffic, the mapping table routes TLPs by using a downstream port number and a function number in a source identification field. For downstream ID based traffic, a destination identifier is replaced by using the mapping table for routing TLPs. For downstream address based traffic, the PCI-Express module uses an address map to route TLPs.

13 Claims, 11 Drawing Sheets

| Upstream Port# (301) | Targeted Function (302) | Downstream Port#0 (FC Controller 0) (302A) | | Downstream Port#1 (FC Controller 1) (302B) | |
|---|---|---|---|---|---|
| | | Physical Chan.0 | Physical Chan.1 | Physical Chan.0 | Physical Chan.1 |
| 0 | 0 | Func.0 | | | |
| 0 | 1 | | | Func.0 | |
| 1 | 0 | | Func.4 | | |
| 1 | 1 | | | | Func.4 |
| 2 | 0 | | Func.5 | | |
| 2 | 1 | | | Func.1 | |
| 3 | 0 | Func.1 | | | |
| 3 | 1 | | | | Func.5 |

FIGURE 3A

| TLP Type (304) | Source ID (305) | Destination ID (306) |
|---|---|---|
| Type 0/1 Configuration Request | Requester ID | Header Bytes 8 and 9 |
| Completion | Completer ID | Requester ID |
| Message Request | Requester ID | Header Bytes 8 and 9 for r(2:0)=010 Implicit for all others. |
| Message Request | Requester ID | N/A |
| I/O Request | Requester ID | N/A |

FIGURE 3B

| Abbreviation | Description |
|---|---|
| SrcID | Source ID |
| DstID | Destination ID |
| DstID(Func) | Function Number field within the Destination ID |
| SrcID(Dev) | Device Number field within the Source ID |
| uPort | Upstream Port# |
| dPort | Downstream Port# |
| MT(xx) | Output of Mapping Table based on xx input. |

| 410 | 411 | 412 | 413 |
|---|---|---|---|
| | | Downstream TLP's | |
| TLP Type | Routing Method | Port Routing | Field Modifications/Actions |
| Config Type 0/1 | ID | MT(uPort, DstID[Func]) | DstID[Func]=MT(uPort, DstID[Func]) SrcID[Dev]=uPort Capture SrcID[Dev] on first access |
| Completion | ID | MT(uPort, DstID[Func]) | DstID[Func]=MT(uPort, DstID[Func]) SrcID[Dev]=uPort |
| Memory Request | Address | Address Range Compare | SrcID[Dev]=uPort |
| I/O Request | Address | Address Range Compare | SrcID[Dev]=uPort |
| Message Request | r[011] | MT(uPort) (Duplicate packet to all dPorts mapped) | SrcID[Dev]=uPort |

| | | Upstream TLP's | |
|---|---|---|---|
| TLP Type | Routing Method | Port Routing | Field Modifications |
| Config Type 0/1 | N/A | N/A | N/A |
| Completion | ID | MT(dPort, SrcID[Func]) | SrcID[Func]=MT(dPort ,SrcID[Func]) DstID[Dev]=Captured DevID |
| Memory Request | Address | MT(dPort, SrcID[Func]) | SrcID[Func]=MT(dPort ,SrcID[Func]) |
| I/O Request | Address | MT(dPort, SrcID[Func]) | SrcID[Func]=MT(dPort ,SrcID[Func]) |
| Message Request | r[000] | MT(dPort, SrcID[Func]) | SrcID[Func]=MT(dPort ,SrcID[Func]) |
| | r[001] | N/A | N/A |
| | r[010] | MT(dPort, SrcID[Func]) | SrcID[Func]=MT(dPort ,SrcID[Func]) |
| | r[011] | MT(dPort, SrcID[Func]) | SrcID[Func]=MT(dPort ,SrcID[Func]) |
| | r[100] | MT(dPort, SrcID[Func]) | SrcID[Func]=MT(dPort ,SrcID[Func]) |

FIGURE 5B

| Message Request Routing Types | |
|---|---|
| r[2:0] | Description |
| 000 | Routed to Root Complex |
| 001 | Routed by Address (Not Used in current specification |
| 010 | Routed by ID |
| 011 | Broadcast from Root Complex |
| 100 | Local-Terminate at receiver |
| 101 | Gathered and routed to Root Complex |
| 110 | Reserved |
| 111 | Reserved |

METHOD AND SYSTEM FOR SHARING INPUT/OUTPUT DEVICES

CROSS REFERENCE TO RELATED APPLICATIONS

This patent application claims priority under 35 U.S.C. §119(e)(1) to the following provisional patent application: Ser. No. 60/653,737 filed on Feb. 17, 2005, entitled "Method and System For Sharing Input/Output Devices", the disclosure of which is incorporated herein by reference in its entirety.

BACKGROUND

1. Field of the Invention

The present invention relates to networks, and more particularly, to sharing input/output (I/O) devices.

2. Background of the Invention

Computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits.

A computer system with the CPU and main memory is often referred to as a host system. Host systems are used in various network applications, including TCP/IP networks, storage area networks ("SANs"), and various types of external device attachment.

Host systems often communicate with peripheral devices via an interface such as the Peripheral Component Interconnect ("PCI") interface, a local bus standard using parallel data transfer that was developed by Intel Corporation®, or the extension of the PCI standard known as PCI-X.

More recently, PCI-Express, a standard interface incorporating PCI transaction protocols at the logical level, but using serial data transfer at the physical level has been developed to offer better performance than PCI or PCI-X. PCI-Express topology uses a PCI-Express switch to route packets. The PCI-Express standard is incorporated herein by reference in its entirety.

One disadvantage of the PCI-Express topology in general and the PCI-Express Switch in particular is that only a single host system at a given time can access a single device, which may be an input/output (I/O) device, for example, a host bus adapter ("HBA"). For efficient use of devices (for example, I/O devices) in networks in general and storage area networks in particular, it is desirable that plural host systems be able to share an I/O device. Conventional PCI-Express switches do not support this option. Existing operating systems also do not allow sharing of I/O devices.

Therefore, what is required is a system and method that allows plural host systems to share an I/O device.

SUMMARY OF THE INVENTION

In one aspect of the present invention, a PCI-Express module that is coupled to plural host systems and to at least an input/output (I/O) device in a network is provided. The PCI-Express module includes an upstream port module and a downstream port module that use a mapping table to facilitate the plural host systems sharing the I/O device by modifying a transaction layer packet (TLP) field.

For upstream ID based traffic, a source identifier is replaced based on the mapping table and a destination identifier is replaced with a value that is captured during upstream port module initialization. For upstream address based traffic, the mapping table routs TLPs by using a downstream port number and a function number in a source identification field.

For downstream ID based traffic, a destination identifier is replaced by using the mapping table for routing TLPs. For downstream address based traffic, the PCI-Express module uses an address map to route TLPs. A vendor defined message is generated by the I/O device and sent to the PCI-Express module each time a PCI configuration Base Address Register is written, and the vendor defined message includes a function number and a base address that are used by a port for routing address based downstream traffic.

In another aspect of the present invention, a method for sharing an I/O device between plural host systems is provided. The method includes, receiving a transaction layer packet (TLP), wherein the TLP is received by an upstream port module or a downstream port module in a PCI-Express Module; and determining if an address based or ID based routing technique is to be used for routing the TLP; wherein to route an upstream address based TLP, a mapping table is used and an address map is used to route an addressed based downstream TLP.

In yet another aspect of the present invention, a system is provided with a PCI-Express module. The PCI-Express module is coupled to plural host systems and to at least one I/O device; wherein the PCI-Express module facilitates the plural host systems sharing an I/O device by using a mapping table and modifying a transaction layer packet (TLP) field.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

In one aspect of the present invention, a PCI Express module is provided that allows sharing of I/O devices between plural host systems by modifying a certain TLP field. The host systems believe that they are connected directly to an I/O device with multiple functions, when in reality the I/O device is being shared.

To facilitate an understanding of the preferred embodiment, the general concepts around the PCI-Express standard specification will initially be described. The specific architecture and operation of the preferred embodiment will then be described with reference to the general discussion.

Figure 1A:
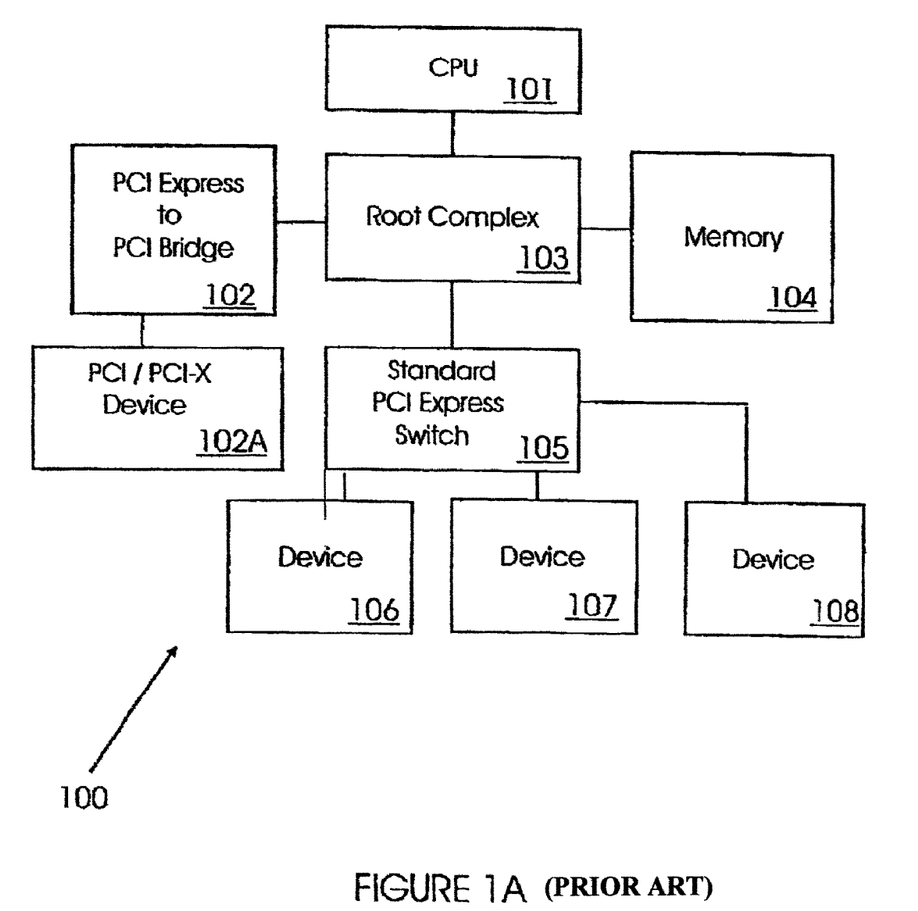
FIG. 1A shows a block diagram of a standard PCI-Express topology.

PCI Express Overview:

FIG. 1A shows a block diagram of a PCI-Express standard fabric topology 100. A central processing unit ("CPU") 101 (part of a computing or host system) is coupled to a "root complex" 103. Root complex 103 as defined by the PCI-Express standard is an entity that includes a Host Bridge and one or more Root Ports. The Host Bridge connects a CPU to a Hierarchy; wherein a Hierarchy is the tree structure of a PCI-Express topology.

Root complex 103 is coupled to a PCI-Express/PCI bridge 102 that allows CPU 101 to access a PCI (or PCI-X) device 102A. Memory 104 is also coupled to root complex 103 and is accessible to CPU 101.

Root complex 103 is also coupled to a standard PCI-Express switch (may also be referred to as "switch") 105 that is coupled to devices 106, 107 and 108. CPU 101 can communicate with any of the devices 106, 107 or 108 via switch 105.

Figure 1B:
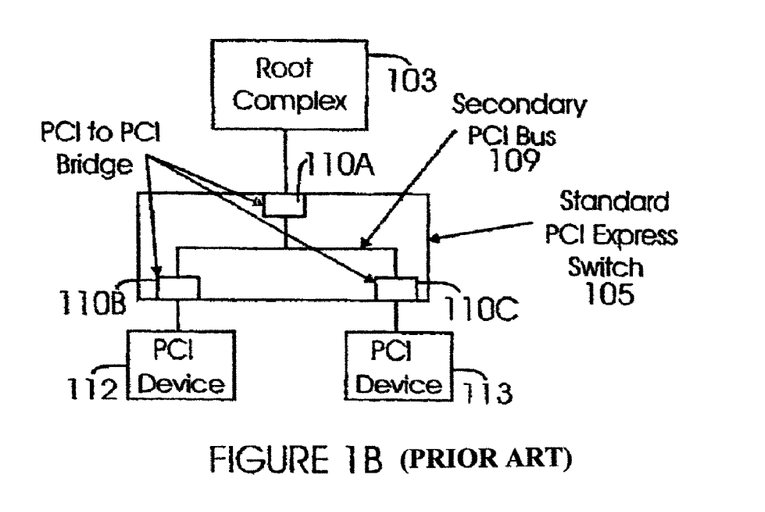
FIG. 1B shows a block diagram of a PCI-Express switch.

The standard PCI-Express switch 105 allows a host system to communicate with more than one device, as shown in FIG. 1A. The block diagram of PCI-Express switch 105 is shown in FIG. 1B. Root complex 103 is coupled to switch 105 via a PCI to PCI link (may also be referred to as "bridge") 110A. Bridge 110B and 110C connect devices 112 and 112A, respectively, to switch 105. Secondary PCI bus 109 couples bridge 110B and 110C.

Figure 1C:
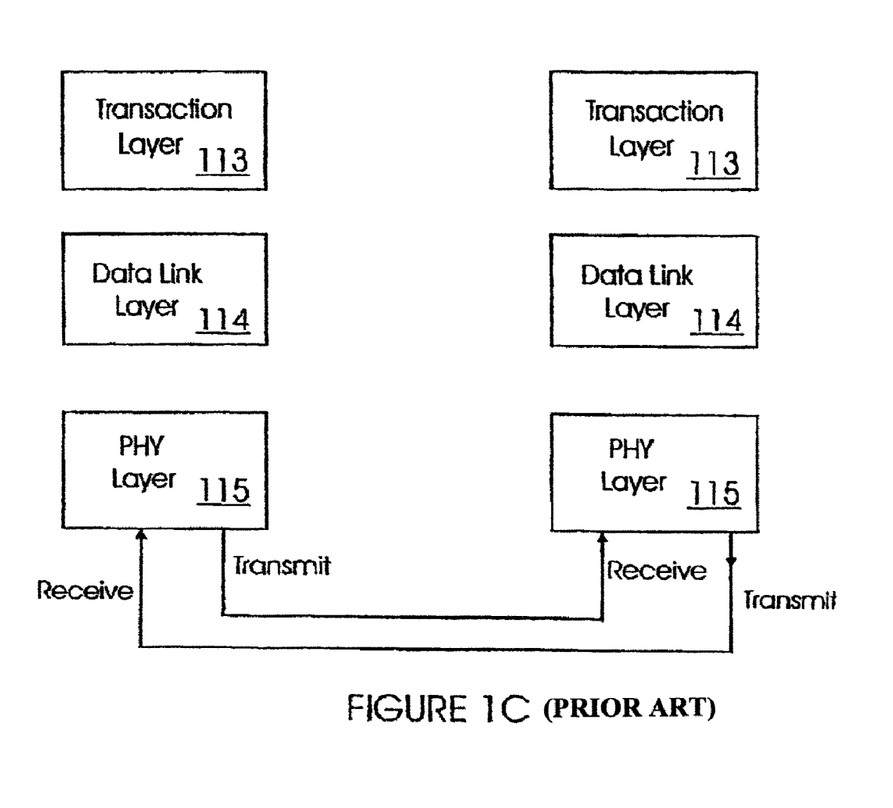
FIG. 1C shows a PCI-Express layered protocol structure in a receive and transmit path.

PCI-Express uses discrete logical layers to process inbound and outbound information. The logical layers are the Transaction Layer 113, Data Link Layer ("DLL") 114 and a Physical Layer ("PHY") 115, as shown in FIG. 1C. A receive side communicates with a transmit side.

PCI-Express uses a packet-based protocol to exchange information between Transaction layers 113. Transactions are carried out using Requests and Completions. Completions are used only when required, for example, to return read data or to acknowledge completion of an I/O operation.

At the transmit side, packets flow from the Transaction Layer 113 to PHY 115. On the receive side, packets are processed by the PHY 115 and sent to the Transaction layer 113 for processing. DLL 114 serves as an intermediate layer between PHY 115 and Transaction layer 113.

The Transaction Layer 113 assembles and disassembles Transaction Layer Packets ("TLPs"). TLPs are used to communicate transactions, such as read and write and other type of events.

Plural types of address spaces are defined by PCI-Express, for example, Memory space, I/O space, configuration space and message space. Memory space is used to transfer data from a memory-mapped location. I/O space is used to transfer data from an I/O mapped location. Configuration packets are used to configure a device, while message packets are used to signal events or are used for general purpose messaging.

Figure 1D:
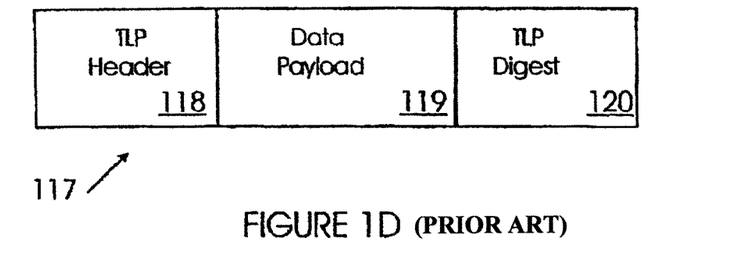
FIG. 1D shows a block diagram of a PCI-Express TLP, used according to one aspect of the present invention.

FIG. 1D shows a block diagram of a TLP 117, which includes a TLP header 118, data payload (if applicable) 119 and optionally, a TLP digest 120. PCI-Express standard in section 2.1.2 describes the TLP format in detail.

TLP header 118 includes a field that denotes the format and type of TLP. The Type field per PCI-Express standard determines how a TLP is routed.

TLP routing may be Address, or identifier ("ID") based. Address based routing is used with memory and I/O requests. ID based routing is used for configuration requests and optionally with Vendor_Defined messages (i.e. specific codes). ID based routing uses Bus, device and function numbers to specify a destination device for a TLP. The bus, device and function numbers are included in header 118.

The term function as used herein is based on the PCI-Express specification definition. Function means a logical function corresponding to a PCI function configuration space. This may be used to refer to one function of a multi-function device or to the only function of a single function device.

Figure 2A:
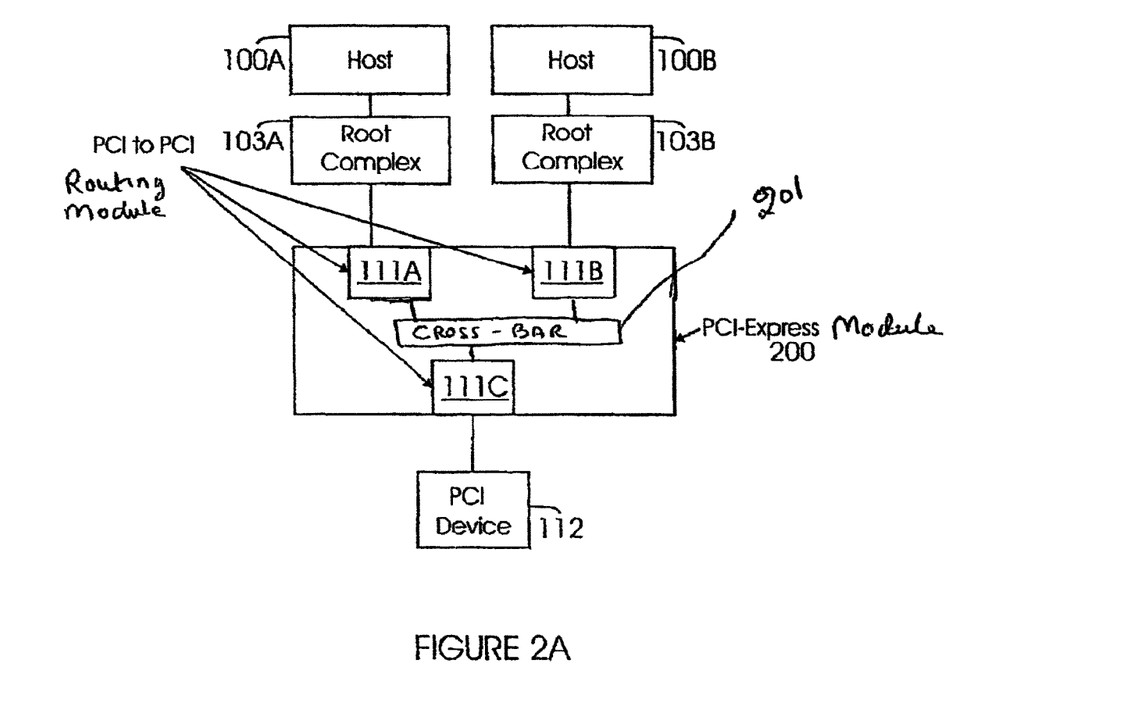
FIGS. 2A-2B show block diagrams of a PCI-Express module (Concentrator), according to one aspect of the present invention.

PCI-Express Module 200:

FIG. 2A shows a block diagram of a PCI-Express Concentrator 200 (may also be referred to as "Module 200") according to one aspect of the present invention that allows plural hosts (for example, hosts 100A and 100B) to communicate with a PCI device 112 (may also be referred to as an I/O device 112) via root complex 103A and 103B. PCI to PCI routing modules 111A and 111B (may also be referred to as port modules) facilitate connectivity between module 200 and root complex 103A and 103B. Port module 111C provides connectivity between device 112 and Module 200.

I/O device 112 supports multiple PCI functions (for example, F0, F1, F2 and F3 (not shown) for a single I/O channel.

Figure 2B:
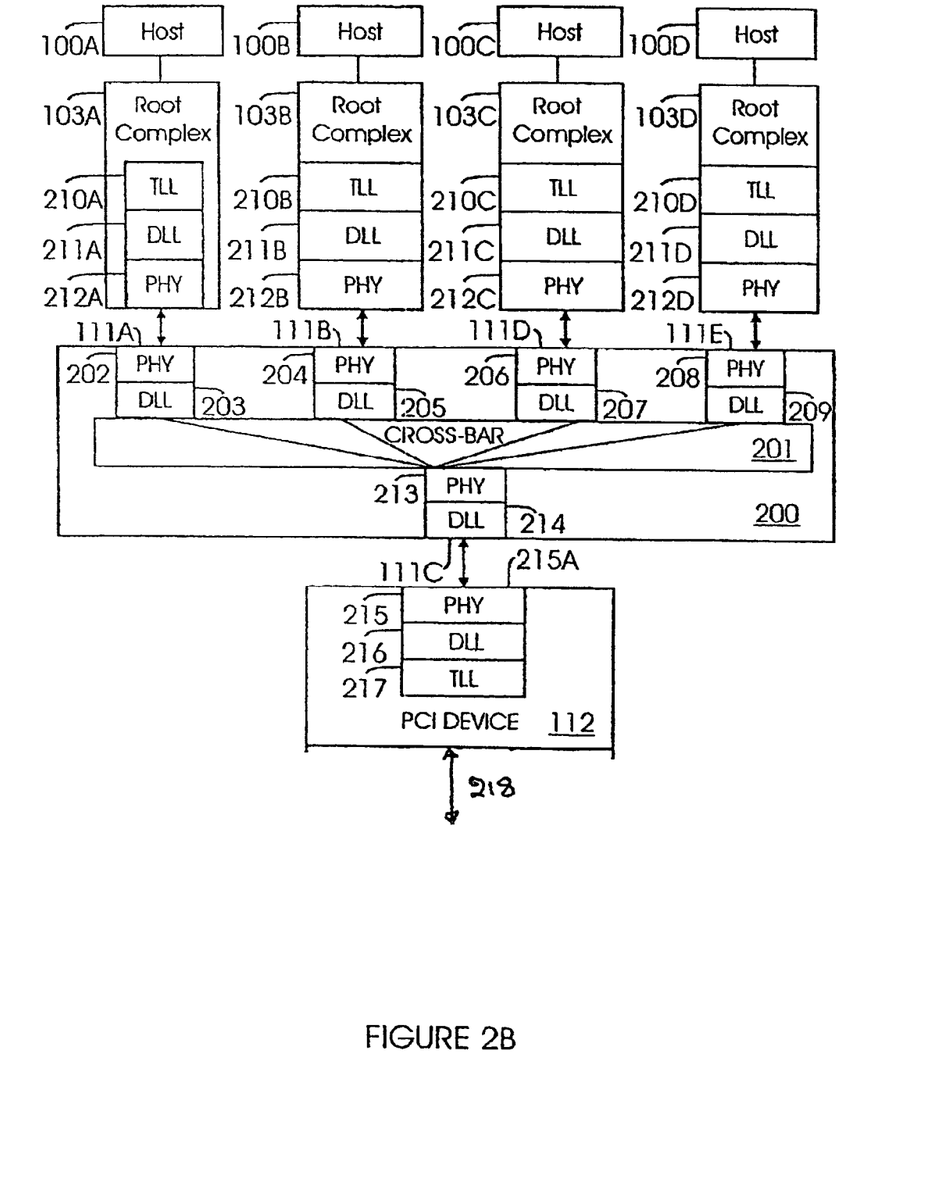

FIG. 2B shows another block diagram of Module 200, with a topology that allows plural hosts to communicate with a single I/O device (for example, a HBA), in one aspect of the present invention. Each host system (100A-100D) is made to believe that they have access and "own" device 112, when in reality device 112 is being shared.

Each root complex (103A-103D) includes a port with a TLL 210A-210D for processing TLPs, a DLL 211A-211D for processing data link layer packets and a PHY layer 212A-212D for interfacing with the physical link.

Each port module (for example, 111A, 111B, 111D and 111E) includes a PHY layer 202, 204, 206 and 208 and a DLL 203, 205, 207 and 209, respectively. Port module 111C that connects device 112 to Module 200 includes a PHY layer 213 and a DLL 214.

Crossbar 201 interconnects port module 111C with port modules 111A, 111B, 111D and 111E and allows packets to flow between hosts 100A-100D and device 112.

Device 112 also includes a port module 215A with a PHY layer 215, a DLL 216 and a transaction layer 217 for handling TLPs. Device 112 includes at least one I/O channel supporting multiple functions to process data packets 218 (to and from a network, for example, a Fibre Channel network).

Fibre channel (incorporated herein by reference in its entirety) is an American National Standard Institute (ANSI) set of standards, which provides a serial transmission protocol for storage and network protocols such as HIPPI, SCSI, IP, ATM and others.

Fiber channel supports three different topologies: point-to-point, arbitrated loop and fiber channel fabric. The point-to-point topology attaches two devices directly. The arbitrated loop topology attaches devices in a loop. The Fibre Channel fabric topology allows several media types to be interconnected.

In one aspect of the present invention, device 112 is a HBA used in a network, for example, a storage area network ("SAN"). SANs are commonly used where plural memory storage devices are made available to various host computing systems. Data in a SAN is typically moved from plural host systems (that include computer systems) to the storage system through various controllers/adapters.

An example of device 112 is described in co-pending patent application Ser. No. 10/948,404, filed on Sep. 23, 2004, the disclosure of which is incorporated herein by reference in its entirety. Device 112 keeps track of the I/O requests, namely, which I/O requests are connected to which functions, and also supports virtualization of N_Port on the Fibre Channel side.

Module 200 description below uses the term "upstream" and "downstream". An upstream port connects to a root complex (for example, port modules, 111A, 111B, 111D and 111E). Downstream port connects module 200 to an I/O device, for example device 112.

Module 200 maps each upstream port and function pair to a downstream port and function pair. Mapping information may be stored in a mapping table (300, FIG. 3A) that may be stored in non-volatile storage (not shown). The mapping table is accessible by Module 200 and can be created dynamically.

Figure 3A:
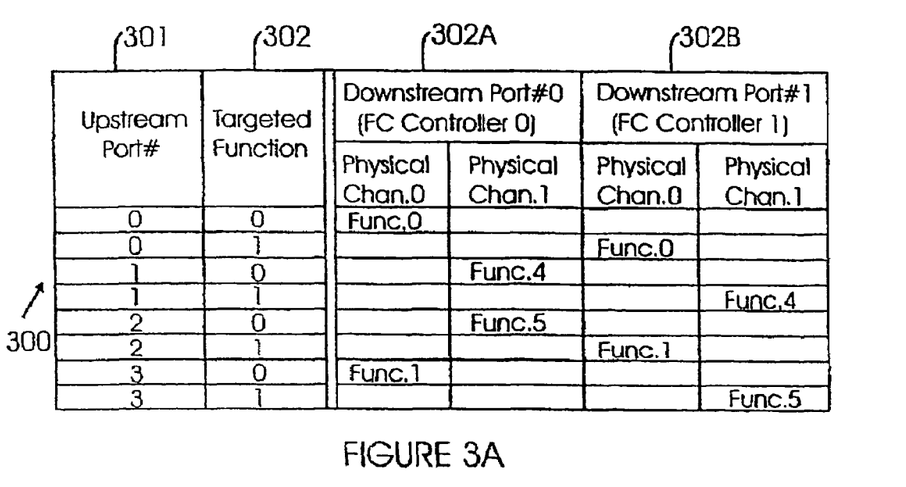
FIG. 3A shows a block diagram of a mapping table used according to one aspect of the present invention.

FIG. 3A shows an example of a mapping table 300. Table 300 maps upstream ports/function pairs (shown under column 301 and 302) to downstream ports numbered 0 and 1 (shown under columns 302A and 302B, respectively) and the appropriate function. As shown in FIG. 3A, each port (shown as Port#0 and Port#1) has two physical I/O channels (shown as Physical Chan. 0 and Physical Chan. 1) that support multiple functions (shown as Func. 0, Func. 1, Func. 4, Func. 5).

The mapping shown in table 300 is to illustrate the adaptive aspects of the present invention. The present invention is not limited to any particular number of ports, number of I/O channels or number of functions. The actual mapping table may vary based on specific implementation.

Figure 3B:
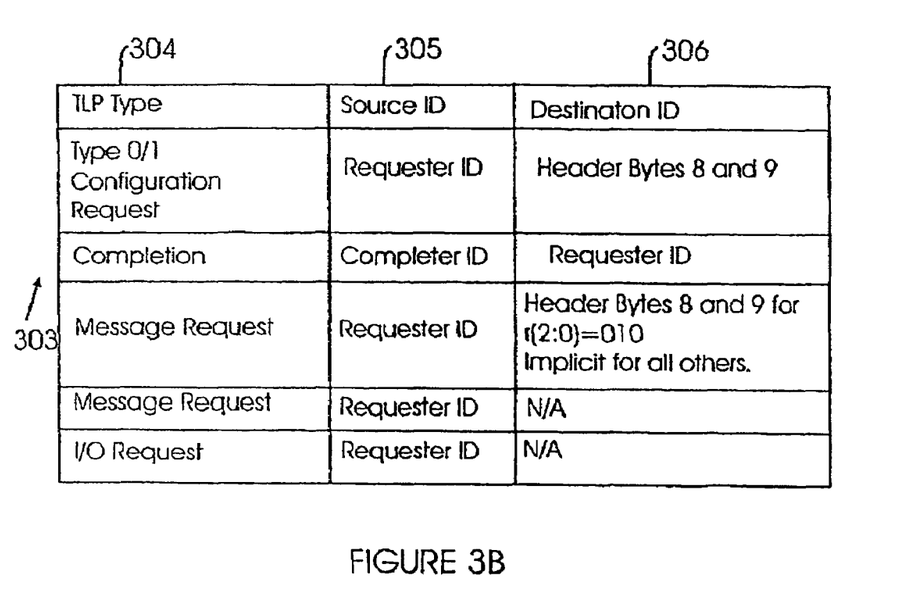
FIG. 3B shows table with a listing of source and destination identifiers, used according to one aspect of the present invention.
Figure 3C:
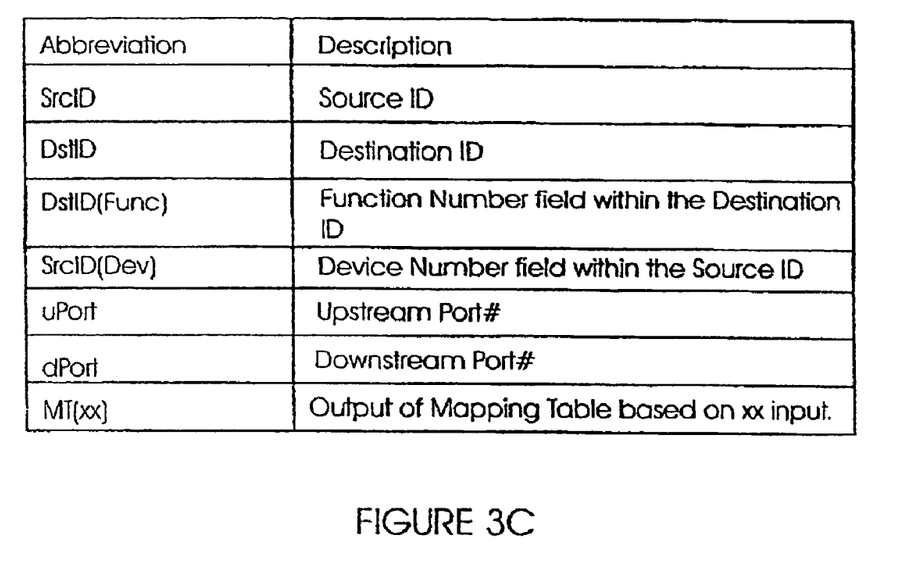
FIG. 3C shows table with a listing of abbreviations, used according to one aspect of the present invention.

FIG. 3C shows a table of various abbreviations that have been used in other figures and the description herein.

Table 303, as shown in FIG. 3B shows the location within a packet header of the SrcID and DstID for various types of TLPs. Column 304 shows the TLP types, i.e. whether a TLP is for a configuration request, completion, a message request or an I/O request.

The SrcID (identifier that identifies the source of the TLP) location is shown in column 305, and the DstID (i.e. the destination of a TLP) location is shown in column 306. It is noteworthy that for a configuration type packet, the Source ID is the "Requester ID" (identifier for the device that send the request), but for a completion type message, the Source ID is the "Completer ID" (i.e. the identifier for the device that sends the completion message).

Upstream packet routing: When a TLP is sent from device 112 to a particular host, mapping table 300 is used to route the TLP. The TLP includes the function number in the source ID field ("SrcID") and the downstream port number. Mapping table 300 is used to determine the destination upstream port for the TLP. Mapping table 300 may be used for both ID and memory based routing.

Downstream ID Based Routing:

Downstream ID based TLP routing is performed by using mapping table 300. When a TLP is received from an upstream port, the upstream port number with a function number in a destination ID field (DstID) is used to route the TLP to the downstream port. The field modifications for routing the TLPs are described below.

Downstream address based Routing: Downstream address based routing presents different challenges. For example, as shown in mapping table 300, upstream port number 1 is mapped to Function 4 in both downstream ports 0 and 1. Memory based TLPs when received by Module 200 do not contain explicit target function number. Hence mapping table 300 by itself is not used directly to route the TLP to the appropriate port.

In one aspect of the present invention, device 112 may send a vendor-defined message (or a special code) to Module 200 each time a PCI configuration Space Base Address Register is written. Each time a host writes to a Base Address Register (standard PCI register) in a Configuration Space register, a vendor-defined message is sent to Module 200 indicating the value that is written. The message includes the function number and base address that was written. This information is then recorded by an upstream port and is used to compare subsequent addresses for routing purposes. An address map table is used to compare and route the address based, downstream TLPs.

In one aspect of the present invention, each upstream port only sees the device/functions that are allowed for a particular port per mapping table 300. During bus/device 112 enumerations, Module 200 snoops TLP's and rejects any configuration requests to devices other than those listed in the mapping table 300.

TLP filtering: Module 200 also performs certain field modifications when packets for ID based routing are received. For downstream traffic (i.e. packets destined for device 112), the DstID [Func] field is modified to match the function number in mapping table 300.

For all upstream traffic, module 200 modifies the SrcID [Func] field to reflect the correct upstream function as determined by the mapping table 300. If the packet is of a type that contains a DstID field (i.e. a Completion TLP) the DstID field is replaced with the Requester ID of the root complex connected to the appropriate upstream port. This value is captured during configuration cycles initiated by the root complex.

The following (with respect to FIGS. 4-6) describes in more detail how downstream and upstream traffic is handled by Module 200, according to one aspect of the present invention.

Figure 4A:
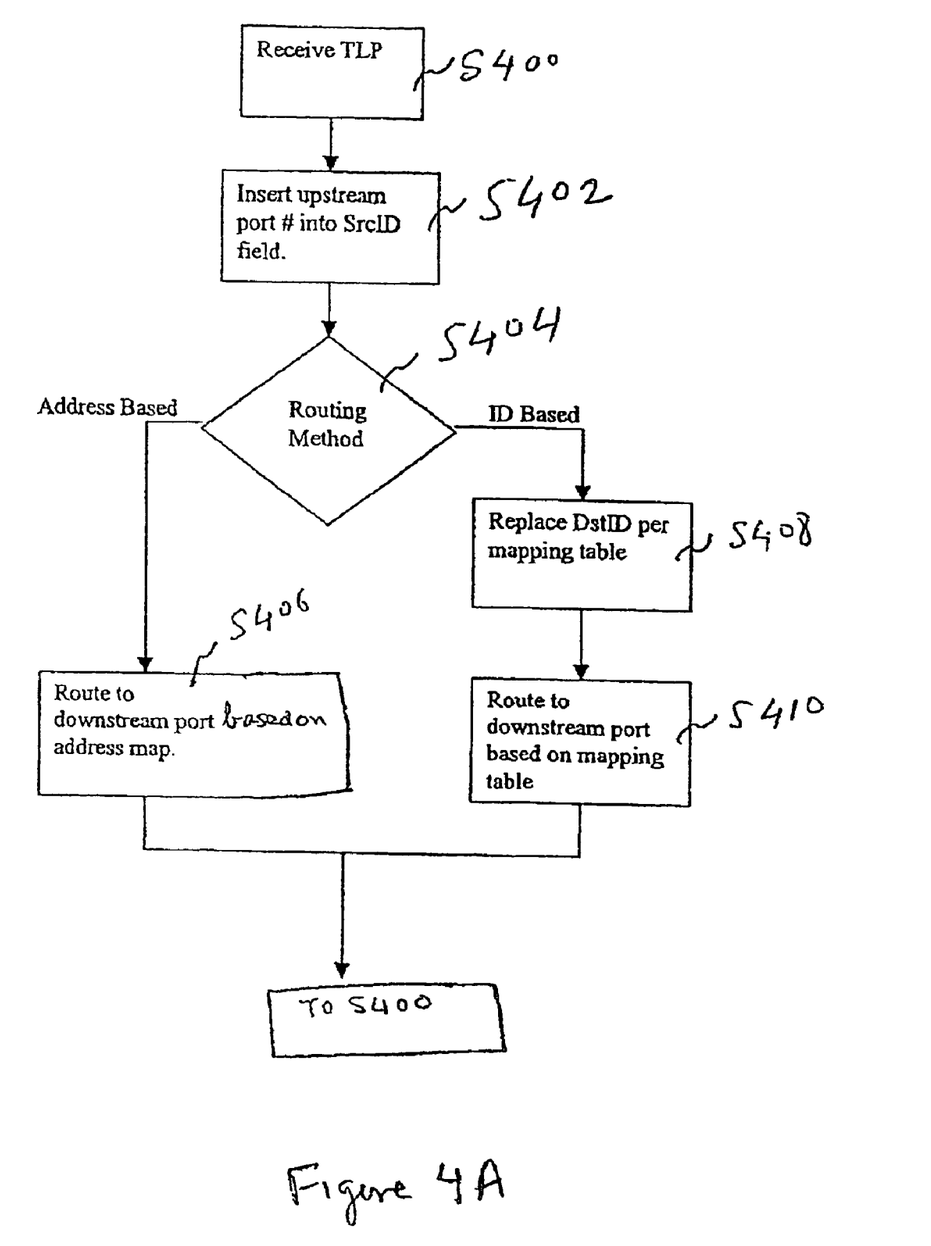
FIG. 4A shows a flow diagram for handling downstream traffic, according to one aspect of the present invention.

Downstream Packet Routing Process Flow:

Turning in detail to FIG. 4A, in step S400, TLPs are received from a host (100A-100D) by port modules (for example, 111A and 111B). In step S402, upstream port (111A/111B) inserts an upstream port number in the SourceID field, which may be the Requester ID or the Completer ID, depending on the type of packet.

In step S404, Module 200 examines the type of packet and determines which type of routing is needed, i.e., an address based routing or ID based routing.

If ID based routing is used, then in step S408, the destination identifier (DstID) is replaced by mapping table 300, and then in step S410, mapping table 300 is used to route the packet to a down stream port (111C).

For address based routing, in step S406, the packet is routed to a downstream port based on an address map.

Figure 4B:
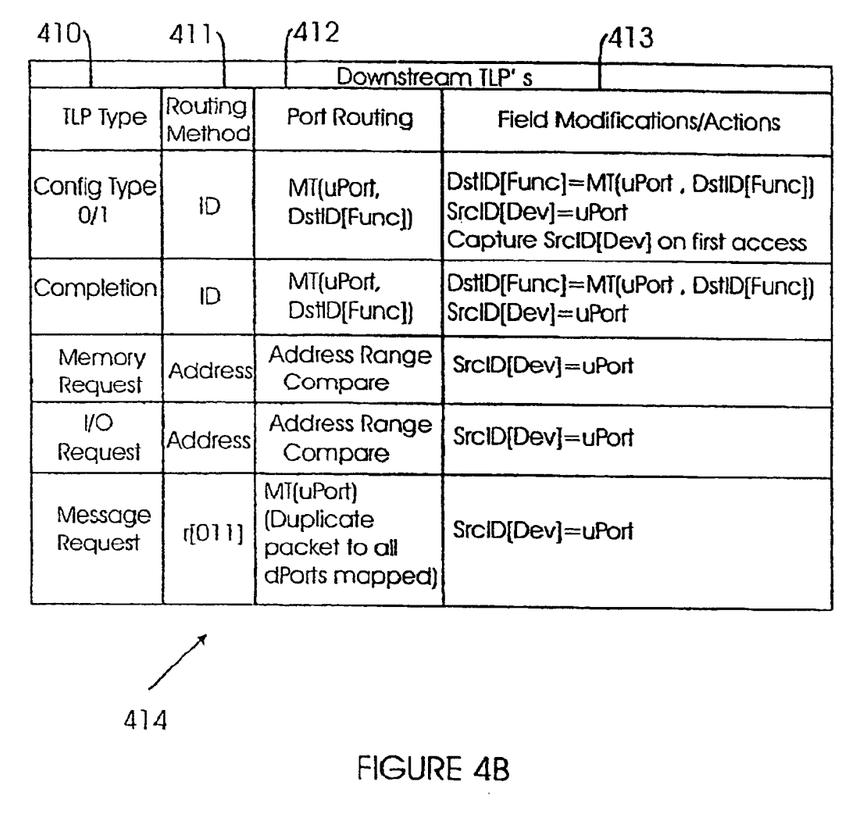
FIG. 4B shows a table showing field modifications for downstream traffic, according to one aspect of the present invention.

FIG. 4B shows table 414, where the TLP type is shown in column 410, the routing method is shown in column 411, port routing is shown in column 412 and the field modifications are shown in column 413. These field modifications will allow plural hosts to share device 112.

Figure 5A:
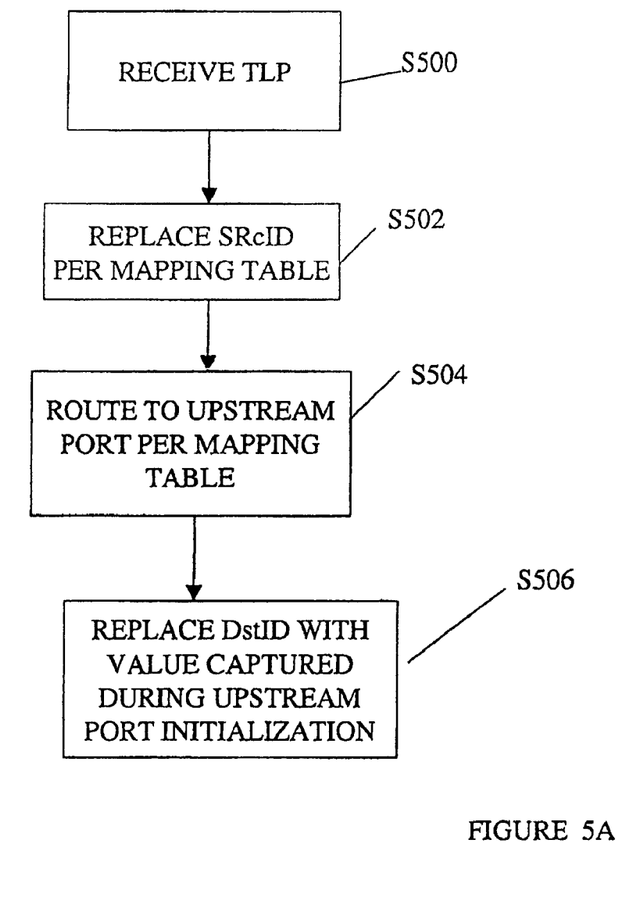
FIG. 5A shows a flow diagram for handling upstream traffic, according to one aspect of the present invention.

Upstream Packet Routing Process Flow:

FIG. 5A shows a process flow diagram for routing ID and address based upstream packets. In step S500, TLPs are received from device 112 by port module 111C.

In step S502, the SrcID Field is replaced per mapping table 300. In step S504, the packet is routed to the upstream port using mapping table 300 and in step S506, the DsTID is replaced with a value that is captured on an upstream port (111A/111B) during initialization. Thereafter, the process returns to step S500.

Figure 5B:
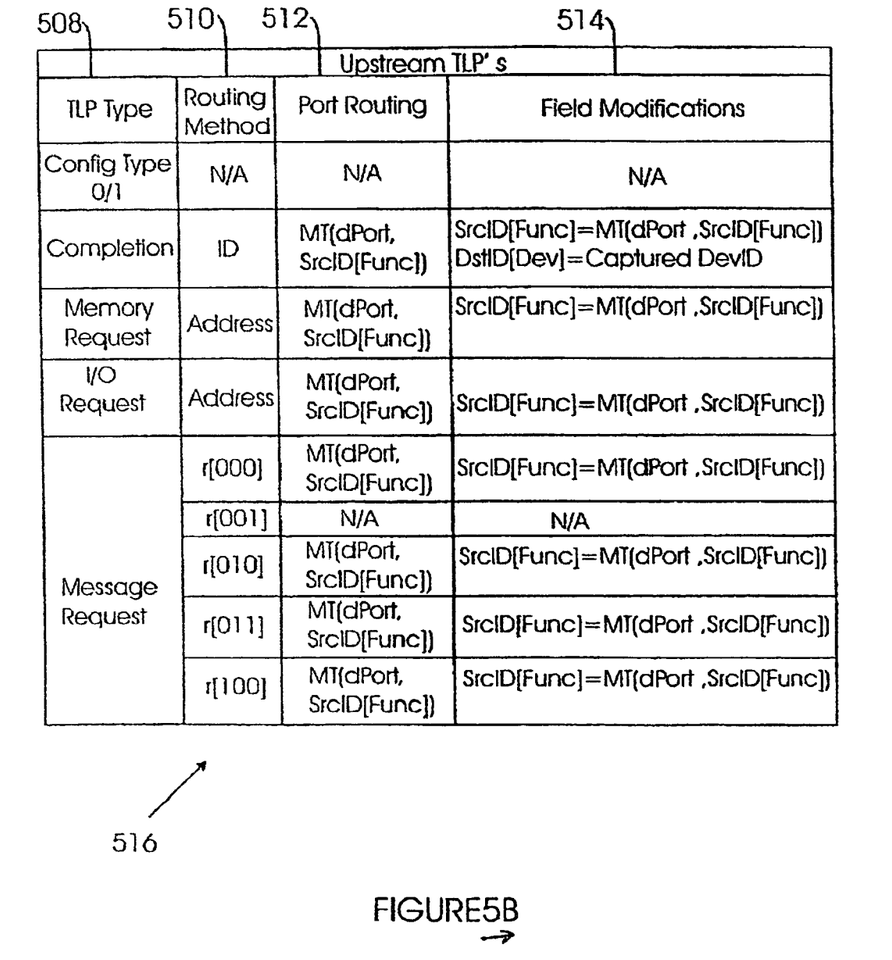
FIG. 5B shows a table showing field modifications for downstream traffic, according to one aspect of the present invention.

FIG. 5B shows a table 516 where field modifications are shown in column 514. TLP types are shown in column 508, the routing method in column 510, and port routing is shown in column 512.

Figure 6:
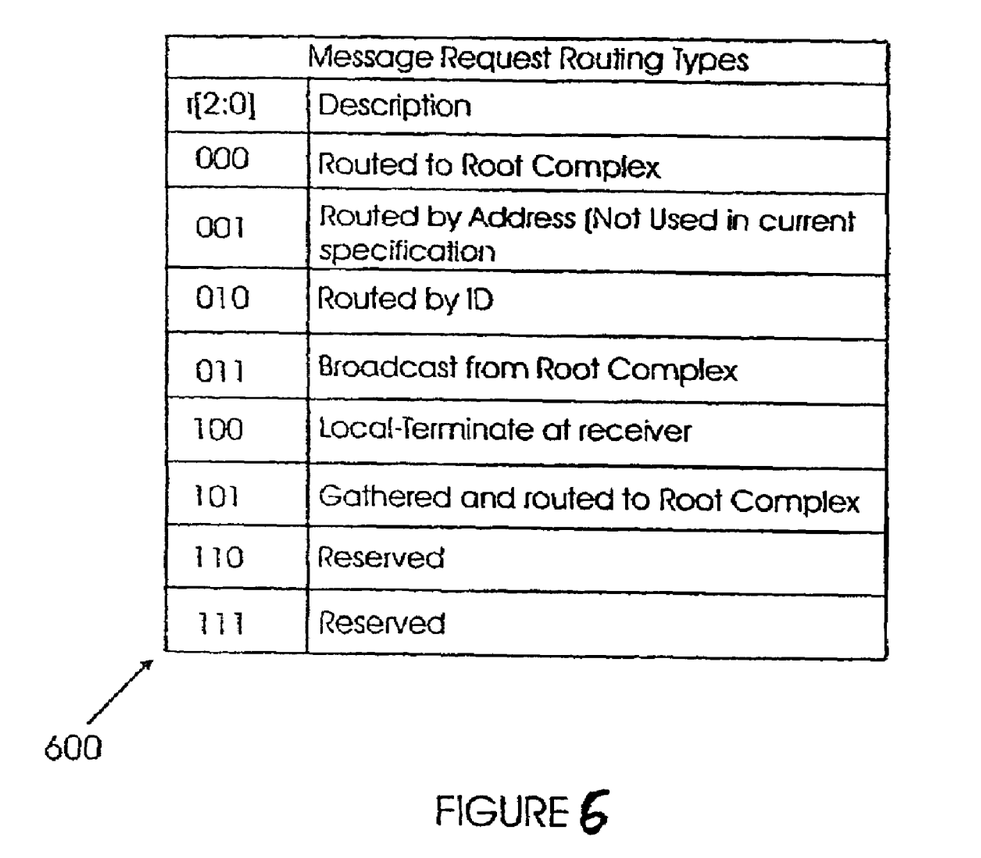
FIG. 6 shows a table for handling message type packets, according to one aspect of the present invention.

Message TLPs can also use multiple routing methods. The type of routing method for a given message TLP is based on the type of message that is being sent. Table 600 in FIG. 6 shows the routing methods that are available for message requests.

In another aspect of the present invention, device 112 provides plural virtual functions to enable sharing of hardware channels. Hence, dedicated hardware/registers on a per function basis are duplicated. For example, for each function supported on a given channel, the configuration space register (including the base addressing register ("BAR"), request and response direct memory access engines, command direct memory access engines, mail box registers and host interface registers are duplicated.

Since the BARs in two different configuration spaces may be set to the same range by two different hosts, a mechanism is used to differentiate the hosts for decoding memory based TLPs. This is accomplished, as described above, where module 200 inserts an upstream port number in the Source ID's device number field. By adding the upstream port number to the address decode, the unique set of configuration registers can then be determined.

Also, a vendor-defined message TLP may be used to communicate BAR settings to module 200 for routing memory based TLPs. Each time a host writes to a BAR configuration space register, a vendor defined message is generated for module 200 indicating the value that was written.

In yet another aspect of the present invention, module 200 is used in a topology where the Fibre Channel ports are attached to an external switch (not shown) with virtual N_Port_ID support. In this aspect, each host port is provided a separate N_Port_ID, thus enabling full zoning and quality of service ("QOS") support. Module 200 will support direct Port-to-Port and legacy switch support without virtual N_Port_ID. To achieve that, OX_ID (a Fibre Channel primitive) space partitioning may be used to segregate traffic.

In one aspect of the present invention, plural host systems can access an I/O device efficiently.

In another aspect of the present invention, because of module 200, a PCI-Express switch or PCI-to-PCI bridge functionality is not required. The root complex sees a single device with multiple functions attached directly. Also, functions may be split across downstream ports, similar to a HBA failover.

Furthermore, mapping of root complex to device/function may be stored in non-volatile random access memory making the system scalable.

Although the present invention has been described with reference to specific embodiments, these embodiments are illustrative only and not limiting. Many other applications and embodiments of the present invention will be apparent in light of this disclosure and the following claims.

What is claimed is:

1. A network system, comprising:
a plurality of host systems; and
a shared PCI-Express module directly coupled to the plurality of host systems and to at least one shared input/output (I/O) device without using a PCI-Express switch and a PCI to PCI bridge such that each of the plurality of host system is unaware of the I/O device being shared among other host systems;
   wherein the shared PCI-Express module includes an upstream port module communicating with the plurality of host systems, and a downstream port module communicating with the I/O device;
wherein the shared PCI-Express module receives a transaction layer packet ("TLP"), examines the TLP and based on a type of the TLP, routes the TLP by using either an identifier ("ID") based routing that uses a bus, device and function number to specify a destination for the TLP or an address based routing that uses an address map for routing the TLP;
wherein when ID based routing is used to route the TLP to the shared I/O device, then a destination identifier field is modified by the shared PCI-Express module to match a function number;
wherein when ID based routing is used to route the TLP to one of the plurality of host systems, then a source identifier is modified by the shared PCI-Express module to include an upstream function number and a destination identifier is replaced with a value captured during an upstream port module initialization;
wherein ID based routing is used for a configuration type TLP that is used for configuring a device and a completion type TLP that indicates completion of a request; and address based routing is used for a memory request and an I/O request.

2. The system of claim 1, wherein upstream address based traffic is routed by a address mapping table by using a downstream port number and a function number in a source identification field.

3. The system of claim 1, wherein a vendor defined message is generated by the I/O device and sent to the PCI-Express module each time a PCI configuration Base Address Register is written, and the vendor defined message includes a function number and a base address that are used by a port for routing address based downstream traffic.

4. The system of claim 1, wherein the PCI-Express module and the I/O device are part of a storage area network.

5. The system of claim 1, wherein the I/O device is a host bus adapter.

6. A PCI-Express module operationally coupled to a plurality of host systems and to at least a shared input/output (I/O) device in a network, comprising:
an upstream port module communicating with the plurality of host systems for sharing the I/O device, such that each host system is unaware that the I/O device is being shared among the plurality of host systems, and
a downstream port module communicating with the I/O device;

wherein the PCI-Express module receives a transaction layer packet ("TLP"), examines the TLP and based on a type of the TLP, routes the TLP by using either an identifier ("ID") based routing that uses a bus, device and function number to specify a destination for the TLP or an address based routing that uses an address map for routing the TLP;

wherein when ID based routing is used to route the TLP to the shared I/O device, then a destination identifier field is modified by the shared PCI-Express module to match a function number;

wherein when ID based routing is used to route the TLP to one of the plurality of host systems, then a source identifier is modified by the shared PCI-Express module to include an upstream function number and a destination identifier is replaced with a value captured during upstream port module initialization;

wherein ID based routing is used for a configuration type TLP that is used for configuring a device and a completion type TLP that indicates completion of a request; and address based routing is used for a memory request and an I/O request.

7. The PCI-Express Module of claim 6, wherein upstream address based traffic is routed by a address mapping table by using a downstream port number and a function number in a source identification field.

8. The PCI-Express Module of claim 6, wherein a vendor defined message is generated by the I/O device and sent to the PCI-Express module each time a PCI configuration Base Address Register is written, and the vendor defined message includes a function number and a base address that are used by a port for routing address based downstream traffic.

9. The PCI-Express module of claim 6, wherein the I/O device is a host bus adapter.

10. A method for sharing an input/output (I/O) device between a plurality of host systems, comprising:

receiving a transaction layer packet (TLP);

wherein if the TLP is for downstream traffic, it is received by an upstream port module of a PCI-Express module from one of the host systems; and if the TLP is for upstream traffic, it is received by a downstream port module of the PCI-Express Module from the I/O device; and wherein the PCI-Express module is directly coupled to the plurality of host systems and to the I/O device without using a PCI-Express switch and a PCI to PCI bridge such that each of the plurality of host system is unaware of the I/O device being shared among the plurality of host systems; and based on a type of the TLP, determining if an address based routing that uses an address map for routing the TLP or an identifier (ID) based routing technique that uses a bus, device and function number to specify a destination for the TLP is to be used for routing the TLP; wherein ID based routing is used for a configuration type TLP that is used for configuring a device and a completion type TLP that indicates completion of a request; and address based routing is used for a memory request and an I/O request;

wherein when ID based routing is used to route the TLP to the I/O device, then a destination identifier field is modified by the PCI-Express module to match a function number;

wherein when ID based routing is used to route the TLP to one of the plurality of host systems, then a source identifier is modified by the PCI-Express module to include an upstream function number and a destination identifier is replaced with a value captured during upstream port module initialization; and wherein an address mapping table is used for address based routing.

11. The method of claim 10, wherein upstream address based traffic is routed by the address mapping table by using a downstream port number and a function number in a source identification field.

12. The method of claim 10, wherein a vendor defined message is generated by the I/O device and sent to the PCI-Express module each time a PCI configuration Base Address Register is written, and the vendor defined message includes a function number and a base address that are used by a port for routing address based downstream traffic.

13. The method of claim 10, wherein the I/O device is a host bus adapter.

* * * * *

UNITED STATES PATENT AND TRADEMARK OFFICE
CERTIFICATE OF CORRECTION

| | | |
|---|---|---|
| PATENT NO. | : 7,694,047 B1 | Page 1 of 1 |
| APPLICATION NO. | : 11/355622 | |
| DATED | : April 6, 2010 | |
| INVENTOR(S) | : Jerald K. Alston | |

It is certified that error appears in the above-identified patent and that said Letters Patent is hereby corrected as shown below:

On Drawing sheet 2 of 11, in Figure 1B, below Ref No. 110 C, line 1, delete "113" and insert -- 112A --, therefor.

In column 8, line 38, in claim 1, after "initialization;" insert -- and --.

In column 9, line 18, in claim 6, after "initialization;" insert -- and --.

Signed and Sealed this
Fourth Day of September, 2012

David J. Kappos
*Director of the United States Patent and Trademark Office*